Patented July 21, 1953

2,646,354

UNITED STATES PATENT OFFICE 2,646,354

THERAPEUTIC FAT PRODUCT

Louis W. Wachtel and Curtis E. Meyer, Kalamazoo, Mich., assignors to The Upjohn Company, Kalamazoo, Mich., a corporation of Michigan No Drawing. Application February 9, 1951,
Serial No. 210,295

5 Claims. (Cl. 99—123)

This invention relates to an edible, therapeutically useful product having a high fat content, which can be tolerated when administered orally in therapeutic quantities over an extended period of time, comprising small particles of an edible vegetable oil stably suspended in an aqueous sugar solution.

The necessity for eating a diet having an unusual high caloric value is a well recognized adjunct in the therapeutic treatment of a wide variety of illnesses to which mankind is subject. In an attempt to meet this need many diets composed of standard food substances have been proposed which, if eaten in their entirety over the required period of time, would supply a large number of calories per day. Such diets have as an important constituent foods having a high fat content, as fats have a caloric value of about nine calories per gram as compared with about four to five calories per gram for carbohydrates and proteins.

However, the high-fat diets which have been proposed leave much to be desired when actually used. Many fatty foods are known to leave the stomach slowly and to cause a feeling of weight, heaviness and fullness which is called the satiety value of fat. This increase in the satiety value which fat gives to a meal is helpful in the nutrition of normal individuals as it reduces the feeling of hunger between meals. This anorexia, or loss of appetite for food, produced by fat in the diet is an obvious disadvantage when the intake of an above-average amount of food is required. This disadvantage is particularly noticeable when attempts are made to give a high caloric diet to an ill or run-down individual for such a person, in addition to the primary cause of his illness, is often suffering at the same time from a loss of appetite or a diminished digestive capacity and tolerance or a combination of them due to the primary cause of illness. When this primary loss of appetite is combined with the secondary loss of appetite resulting from the eating of high fat meals there results a reduction in quantity of the food eaten so that the theoretical usefulness of the diet is lost.

It is also known that not all of the fat present in the suggested diets is absorbed, so that while the desired number of calories as determined calorimetrically are present in the meal a significant part of the ingested fat appears in undigested form in the faeces. In order to avoid the complication of lack of digestibility, the use of large amounts of milk and milk products such as cream, butter and the like have been proposed. In spite of the palatability of these products when taken in the customary moderate quantities they are not as useful as components of a high-fat diet as might be anticipated. For example while the daily consumption of one-half pint of thirty percent cream or a quarter of a pound of butter in addition to an average diet should solve the problem, it has not proven so in practice. After a day or two on such a diet the patient usually becomes nauseated at the sight of food and for this as well as other reasons becomes physically unable to swallow and keep down the required quantity of food. It also should be noted that while the problems of high carbohydrate and, in particular high-protein diets, have received much attention and as a result of this attention modified protein and carbohydrate products are available which have achieved great success in therapy and which are of considerable commercial importance, nothing of a similar nature has been accomplished with regard to a therapeutically useful fat product.

It is an object of this invention to provide a therapeutically useful product having a high fat content. It is also an object of this invention to provide a product having a high fat content which can be tolerated when administered orally in therapeutically useful quantities over an extended period of time. It is an additional object of this invention to provide a product having a high fat content in which the fat is readily assimilable by the digestive tract and not excreted unchanged. A further object is the provision of a product having a high fat content which is stable, and edible after prolonged storage without refrigeration. It is also an object of this invention to provide an edible product having a high fat content which can be mixed with other constituents of the diet without harmful effect on the therapeutic utility of the product. Other objects of this invention will become apparent hereinafter.

The product which accomplishes the objects of this invention and is free from the objections of presently available products comprises particles of a suitable edible vegetable oil, having a diameter of less than about 2.5 microns and averaging about 0.5 micron in diameter, stably suspended in a solution of a sugar in water as is more fully described below.

The edible vegetable oils which can be used in the product of this invention are the non-drying vegetable oils of the olive oil type such as olive and peanut oils with peanut oil being preferred. To prevent oxidation of these oils during processing and rancidity during storage an anti-oxidant can be added although it is not required. Edible anti-oxidants of the phenolic type such as the tertiary butyl hydroxy anisoles and the like are suitable.

The concentration of the sugar solution in which the oil is suspended is of importance in achieving the objects of this invention. Suitable sugars are the monosaccharides such as glucose and fructose and the disaccharides such as sucrose and maltose. The caloric value of the saccharides is about the same so that the quantity of sugar which is desirably present in the water is in part dependent on its sweetness. Disaccharides such as sucrose and maltose being sweeter and having more flavor are desirably present in smaller quantities than the monosaccharides such as glucose and fructose. Between about ten and about twenty-five percent by weight of the water used can be a sugar. The ten to fifteen percent range is preferred for sucrose and the like while the fifteen to twenty-five percent range is preferred for glucose and the like with about twenty percent glucose having been found to be the most satisfactory.

The ratio between the weight of the oil and the weight of the sugar solution is of utmost importance with respect to the utility of the product. When the weight of the oil amounts to more than fifty percent of the total weight of the product, the viscosity of the suspension is so high that it is no longer free flowing and easily consumed and thus is not suitable for use in achieving the objects of the present invention. When the weight of the oil is below about 35 percent by weight the caloric value of the product is so low that the increased volume required becomes an increasing handicap as the oil content is decreased.

The mixture of suspending and stabilizing agents used in the product of this invention is of critical importance. It has been found that soybean phosphatides (lecithin) and a mono-ether of a polyethylene glycol mixed in certain definite proportions and used in a total amount of at least 1.2 percent in combination with the oil and sugar solutions previously described give a product which will achieve the objects of the invention. No single agent has been found which will keep vegetable oil particles of the required size suspended in the sugar solution for a sufficiently long time without the suspension being, at the same time, of such a consistency as to render it useless for its intended purpose. Among the polyethylene glycol mono-ethers which can be combined with soybean phosphatides (lecithin) in the present invention are the mono-isooctylphenyl ether of a polyethylene glycol ("Triton WR 1339) and the mono-polyethylene glycol ether of sorbitan monooleate (Tween 80).

As has been previously stated the proportions of the soybean phosphatides and polyethylene glycol ether is critical. The soybean phosphatides must be present in an mount of at least one percent by weight of the finished product and the polyethylene glycol ether must be present in an amount of at least 0.1 percent by weight of the finished product. Further the percent of polyethylene glycol ether multiplied by ten plus the percent of phosphatides must equal at least 3.0. For example 0.1 percent polyethylene glycol ether and 1.0 percent phosphatides does not meet the required proportions as the numerical value of 2.0 is obtained by substitution in the above equation, while a mixture 0.2 percent polyethylene glycol ether and 1.0 percent phosphatides meets the requirements giving the value 3.0. The maximum amount of phosphatides that can be used to obtain a suitable product is about 3.5 percent, without regard to the amount of polyethylene glycol ether used. The maximum amount of polyethylene glycol ether that can be used is not known, but amounts in excess of one percent add nothing to the utility of the product when combined with the required minimum quantity of phosphatides.

The following examples illustrate certain preferred embodiments of the invention but are not to be construed as limiting.

*Example 1.*—Preparation of therapeutic fat product.

To prepare 200 liters of product the following ingredients were used:

| | Parts |
|---|---|
| Peanut oil U. S. P | 80,000 |
| Polyethylene glycol mono-isooctylphenyl ether | 400 |
| Tertiary butyl-4-hydroxy anisole | 16 |
| Purified soybean phosphatides | 4,000 |
| Sodium benzoate | 200 |
| Hydrochloric acid | 70 |
| De-ionized water | 95,000 |
| Dextrose | 20,000 |
| Flavor | q. s. |

The de-ionized water was brought to a boil to remove dissolved air after which the dextrose and sodium benzoate were added with stirring. The solution was cooled to about 90–95 degrees centigrade and the phosphatides added with continued stirring until the phosphatides were in colloidal solution, whereupon the flavor and hydrochloric acid were added. The peanut oil, to which the tertiary butyl-4-hydroxy anisole and the polyethylene glycol mono-isooctylphenyl ether had been added, was added to and thoroughly suspended in the sugar solution using a high speed propeller type agitator, the temperature of the suspension being maintained during these operations at a temperature of 90 to 95 degrees centigrade.

The hot suspension was then passed through a Manton-Gaulin two-stage homogenizer with a pressure of 3000 p. s. i. on the first stage valve and 1000 p. s. i. on the second stage valve. The product after bottling at a temperature of about 70–75 degrees centigrade was ready for storage until used.

When the process was carried out as above but using 400 parts of the polyethylene glycol ether of sorbitan monooleate (Tween 80) in place of the mono-isooctylphenyl ether of polyethylene glycol in the above list of ingredients a product of equal utility was obtained.

Similar products containing from 35 to 45 percent oil and from five to fifteen percent sugar can be obtained in a like manner and are also suitable for use, although ten percent glucose is preferred.

Example 2

A suspension of peanut oil (1200 parts) in a solution of 300 parts of glucose in 1460 parts of water was prepared as in Example 1 using the proportions of suspension stabilizers and with the results as indicated below:

| Triton WR 1339 | 0.2% | 0.1% | None |  |  |
|---|---|---|---|---|---|
| Phosphatide | None | 1.0% | 2.0% |  |  |
| Product Suitability | Bad | Bad | Bad |  |  |
| Triton WR 1339 | 0.3% | 0.3% | 0.1% | 0.2% | None. |
| Phosphatide | None | 0.5% | 2.0% | 0.1% | 3.0%. |
| Product Suitability |  | Poor | Good | Good | Poor. |
| Triton WR 1339 | 0.4% | 0.2% | 0.1% | None |  |
| Phosphatide | None | 2.0% | 3.5% | 4.0 |  |
| Product Suitability |  | Good | Good | Thick |  |
| Triton WR 1339 | 0.5% | 0.2% | None |  |  |
| Phosphatide | None | 3.0% | 5.0 |  |  |
| Product Suitability | Bad | Good |  |  |  |
| Triton WR 1339 | 1.0 | 1.0 | 1.0 | 1.0 |  |
| Phosphatide | None | 1.0 | 2.0 | 3.5 |  |
| Product Suitability | Fair | Excellent | Excellent | Excellent |  |

Products prepared as above using Tween 80 in place of Triton WR 1339 showed similar behavior as to properties and utility.

Having thus described our invention we claim:

1. A stable, free flowing, edible, concentrated, therapeutic source of calories having acceptable palatability and being suitable for repeated oral administration comprising: particles of a low-melting, non-drying, edible vegetable oil having an average diameter of about 0.5 micron stably suspended in a vehicle comprising a fifteen to twenty-five percent solution of a sugar in water and a suspension stabilizer, the amounts of vegetable oil and the sugar solution being such that between 35 percent and 45 percent of the total weight of the product is vegetable oil and between about 64 percent and about 54 percent of the total weight of the product is the sugar solution and at least 1.2 percent by weight of the product is suspension stabilizer, said suspension stabilizer consisting of a mixture of phosphatides and polyethylene glycol ether, the ratio of phosphatides to polyethylene glycol ether being such that $$\% \text{ phosphatide} + (\% \text{ polyethylene glycol ether}) \times 10 = \text{at least } 3$$

the percentages being based on the total weight of the product, said product being characterized by being free flowing at room temperatures, showing no appreciable separation on standing at room temperatures for at least nine months or at forty-seven degrees centigrade for at least six weeks, being capable of dilution with at least an equal volume of water or other bland edible liquid without separation and being readily assimilable by the digestive tract of man and tolerated by those wherein the oral administration of therapeutic quantities of dietary fat is required.

2. A stable, free flowing, edible, concentrated, therapeutic source of calories having acceptable palatability and being suitable for repeated oral administration comprising a product containing from about 35 percent to about 45 percent by weight of a low-melting, non-drying, edible vegetable oil and about 54 to 64 percent by weight of a 15 percent to 25 percent solution of a sugar in water, said oil being present as particles having an average diameter of about 0.5 micron and being stably suspended in and coated by said sugar solution, the suspension being stabilized by between 1.2 percent and 4.5 percent of a mixture of soybean phosphatides and polyethylene glycol mono-isoctylphenyl ether, in which the phosphatide is present in an amount between 1.0 and 3.5 percent and the mono-isoctylphenyl ether is present in an amount of from 0.1 percent to 1.0 percent which are combined in such proportions that $$\% \text{ phosphatides} + (\% \text{ polyethylene glycol ether}) \times 10 = \text{at least } 3$$

all percentages being expressed as percent by weight of the total weight of the product.

3. A stable, free flowing, edible, concentrated, therapeutic source of calories having acceptable palatability and being suitable for repeated oral administration comprising from about 35 percent to about 45 percent by weight of a low-melting, non-drying, edible vegetable oil and about 54 to about 64 percent of a 15 percent to 25 percent solution of sugar in water, said oil being present as particles having an average diameter of about 0.5 micron and being stably suspended in and coated by said sugar solution, the suspension being stabilized by between 1.2 percent and 4.5 percent of a mixture of soybean phosphatides and a monopolyethylene glycol ether of sorbitan monooleate consisting of between 1.0 percent and 3.5 percent of soybean phosphatides and between 0.1 percent and 1.0 percent of the polyethylene glycol ether of sorbitan monooleate combined in such proportions that $$\% \text{ phosphatide} + \% \text{ polyethylene glycol ether of sorbitan monooleate} = \text{at least } 3$$

all percentages being expressed as percent by weight of the total weight of the product.

4. A stable, free flowing, edible, concentrated therapeutic source of calories having acceptable palatability and being suitable for repeated oral administration comprising particles of peanut oil having an average diameter of about 0.5 micron stably suspended in a twenty percent solution of glucose in water and a suspension stabilizer; the peanut oil being present in an amount of about 40 percent, the glucose solution being present in an amount of about 57.5 percent and the suspension stabilizer consisting of 2.0 percent of soybean phosphatides and 0.2 percent of polyethylene glycol mono-isooctylphenyl ether, all percentages being expressed as percent by weight of the total weight of the product.

5. A stable, free flowing, edible, concentrated therapeutic source of calories having acceptable palatability and being suitable for repeated oral administration having the following composition:

| | Parts |
|---|---|
| Peanut oil | 80,000 |
| Polyethylene glycol mono-isooctylphenyl ether | 400 |
| Tertiary butyl 4-hydroxy anisole | 16 |
| Purified soybean phosphatides | 4,000 |
| Sodium benzoate | 200 |
| Hydrochloric acid | 70 |
| De-ionized water | 95,000 |
| Dextrose | 20,000 |
| Flavor | q. s. | wherein the peanut oil is present as particles having an average diameter of about 0.5 micron and is stably suspended in and coated by water as the continuous phase.

LOUIS W. WACHTEL.
CURTIS E. MEYER.

References Cited in the file of this patent

UNITED STATES PATENTS

| Number | Name | Date |
|---|---|---|
| 1,034,036 | Schmitt | July 30, 1912 |
| 1,558,069 | Williams | Oct. 20, 1925 |
| 1,774,771 | Stejskal | Sept. 2, 1930 |
| 2,422,486 | Johnston | June 17, 1947 |

OTHER REFERENCES

"The Condensed Chemical Dictionary," third edition, Gregory, Reinhold Publishing Corporation, New York, 1942, page 647.